A. F. GRABOWSKI.
HAIR CURLING MACHINE.
APPLICATION FILED MAR. 8, 1915.
1,255,410.
Patented Feb. 5, 1918.
10 SHEETS—SHEET 2.
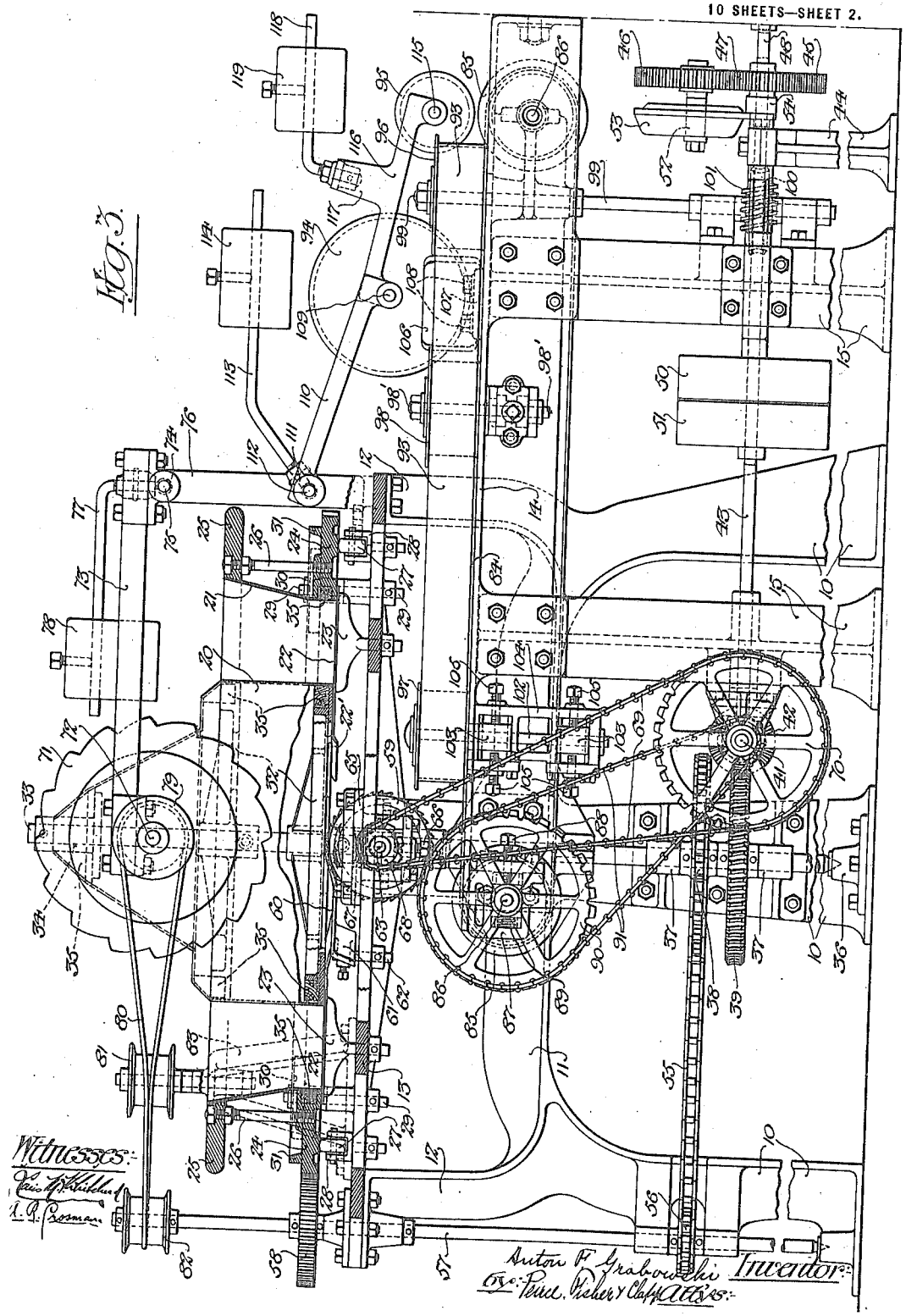

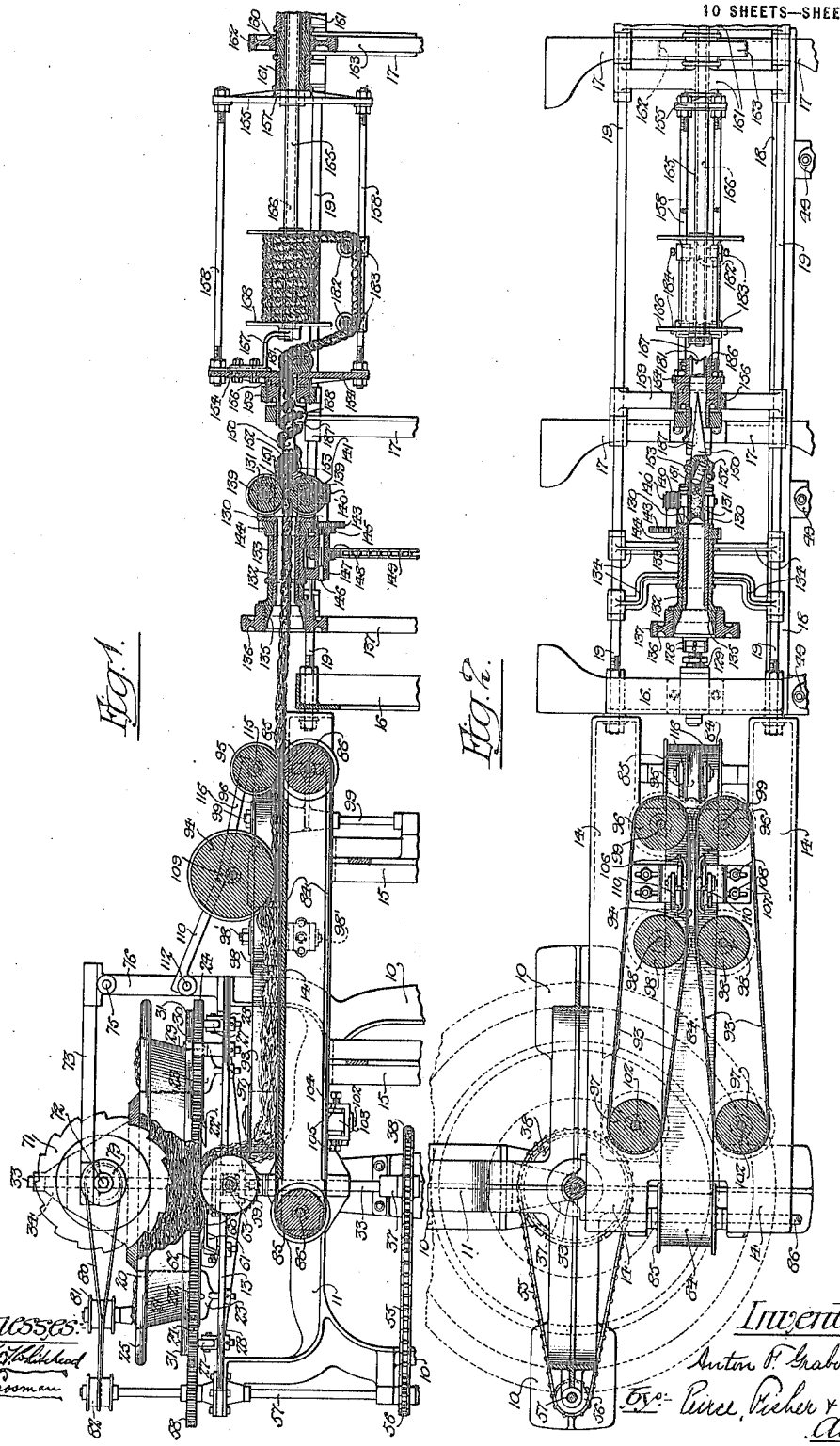

A. F. GRABOWSKI.
HAIR CURLING MACHINE.
APPLICATION FILED MAR. 8, 1915.
1,255,410.
Patented Feb. 5, 1918.
10 SHEETS—SHEET 3.
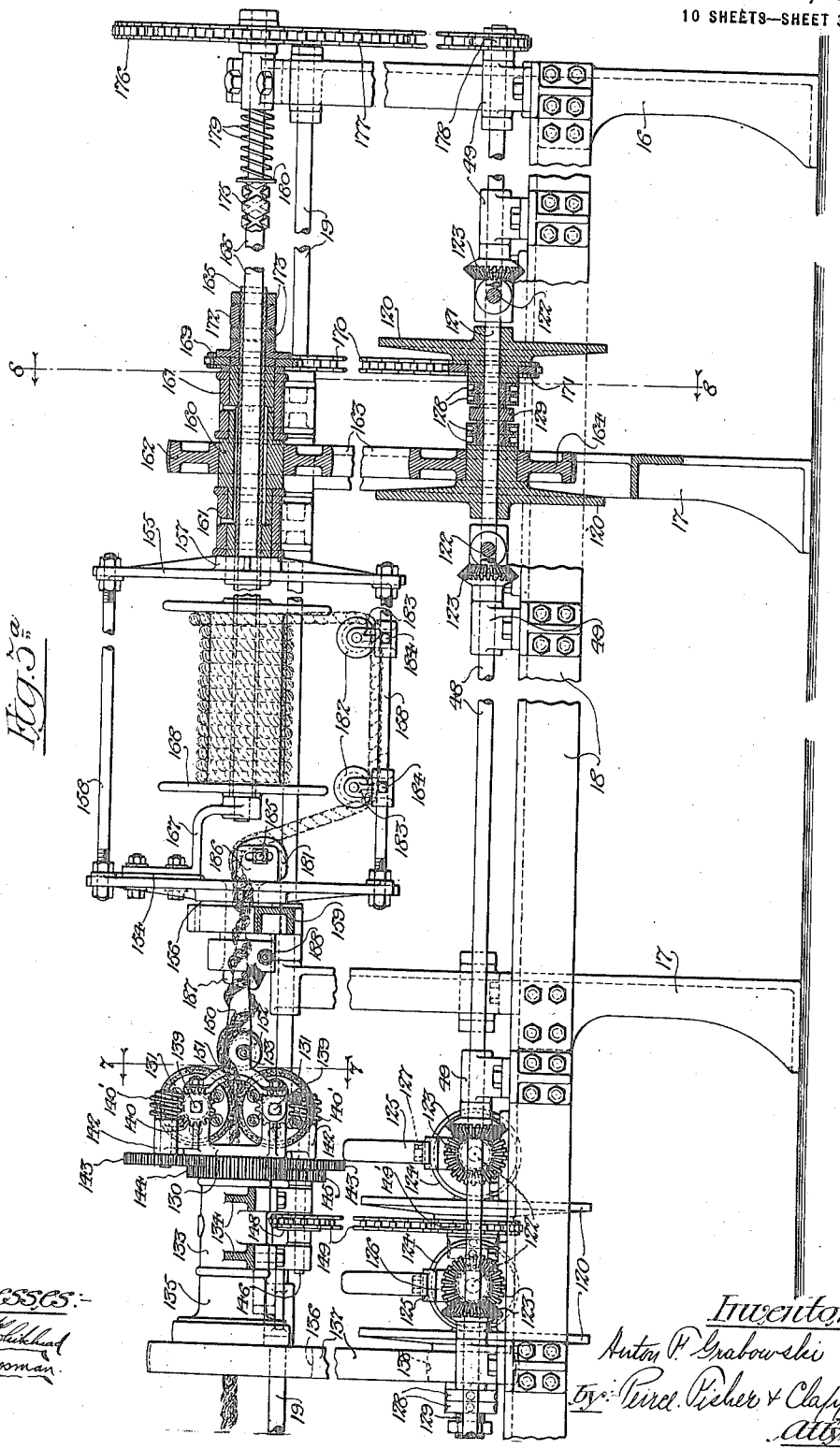

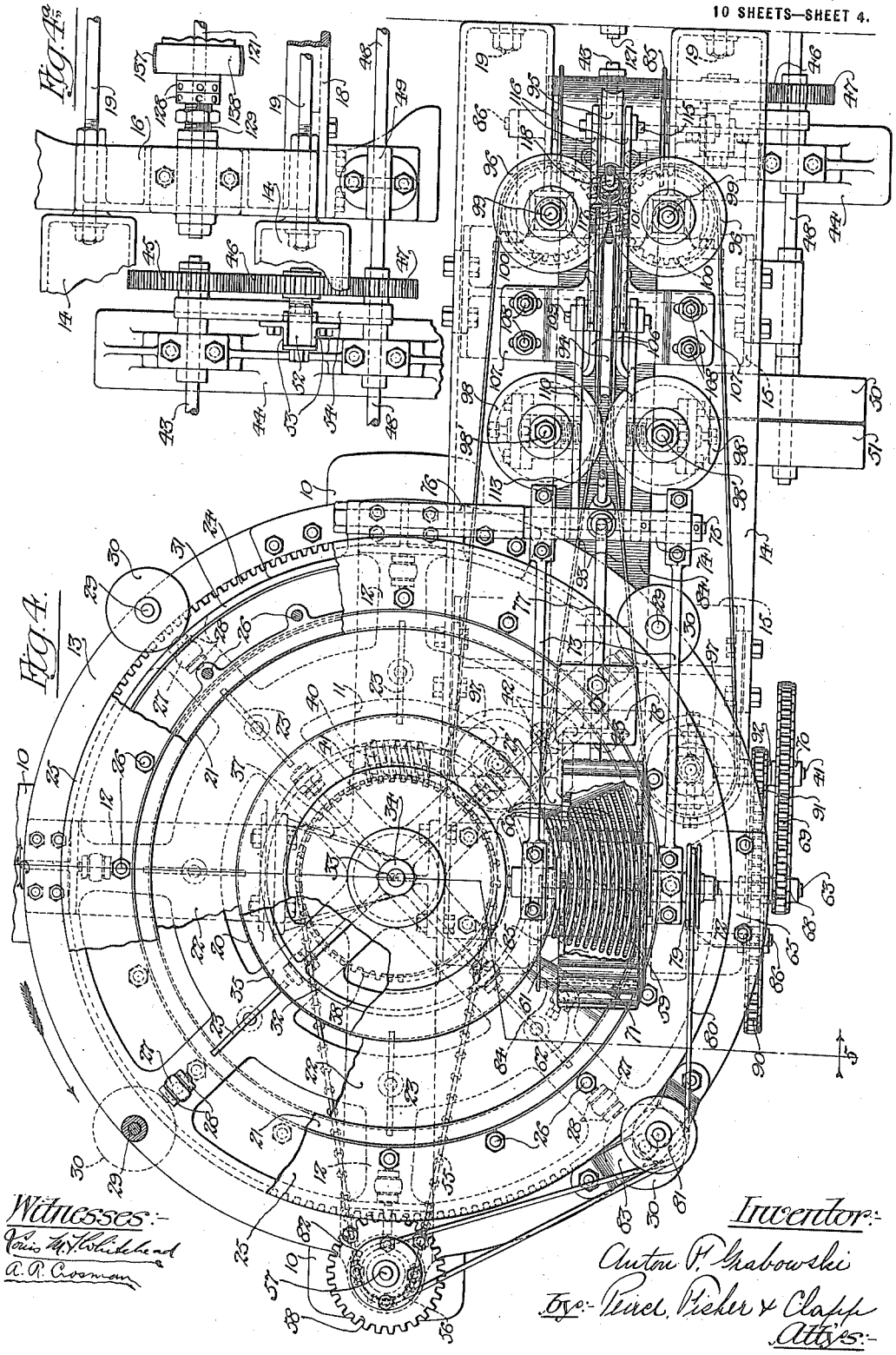

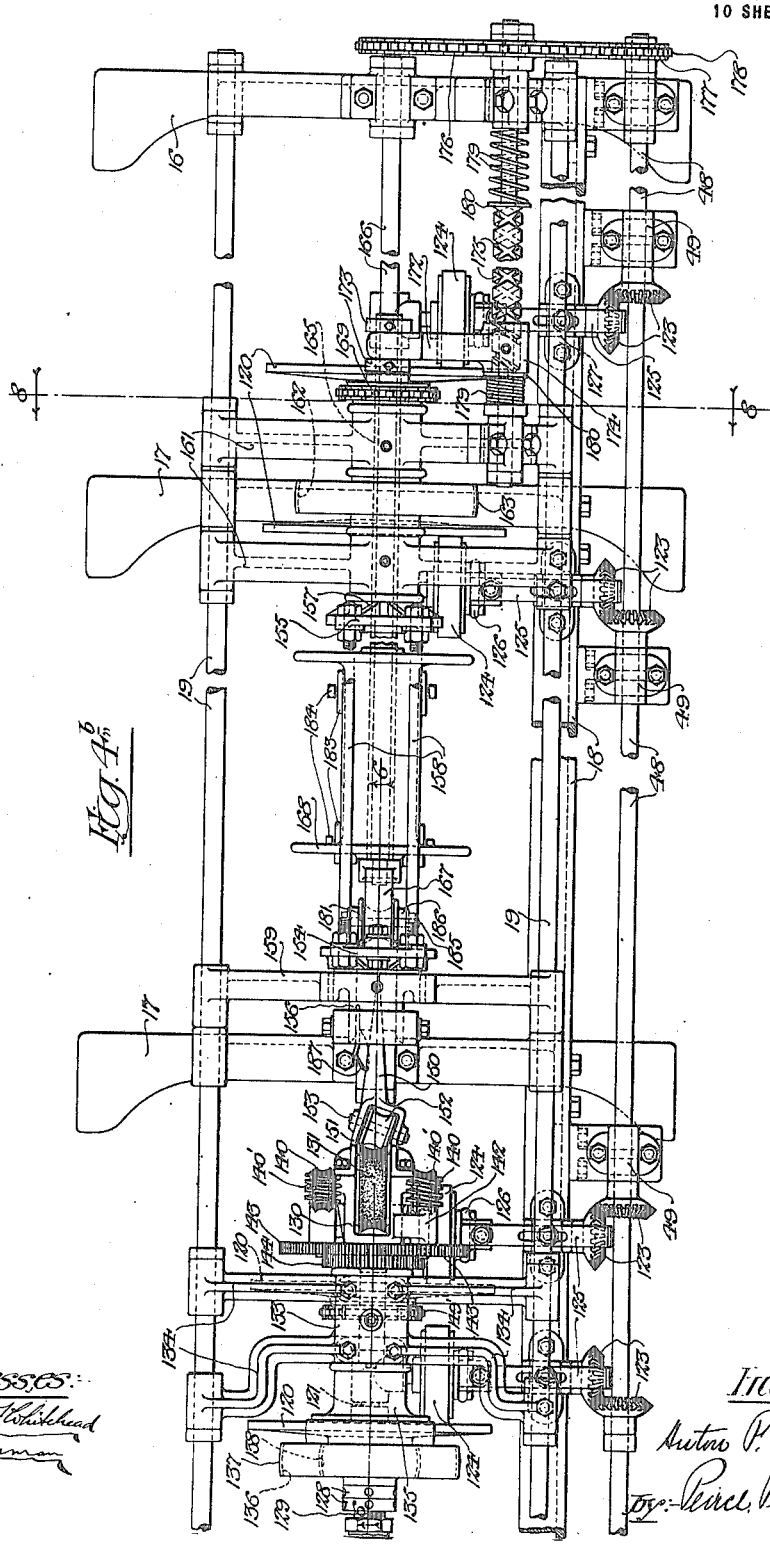

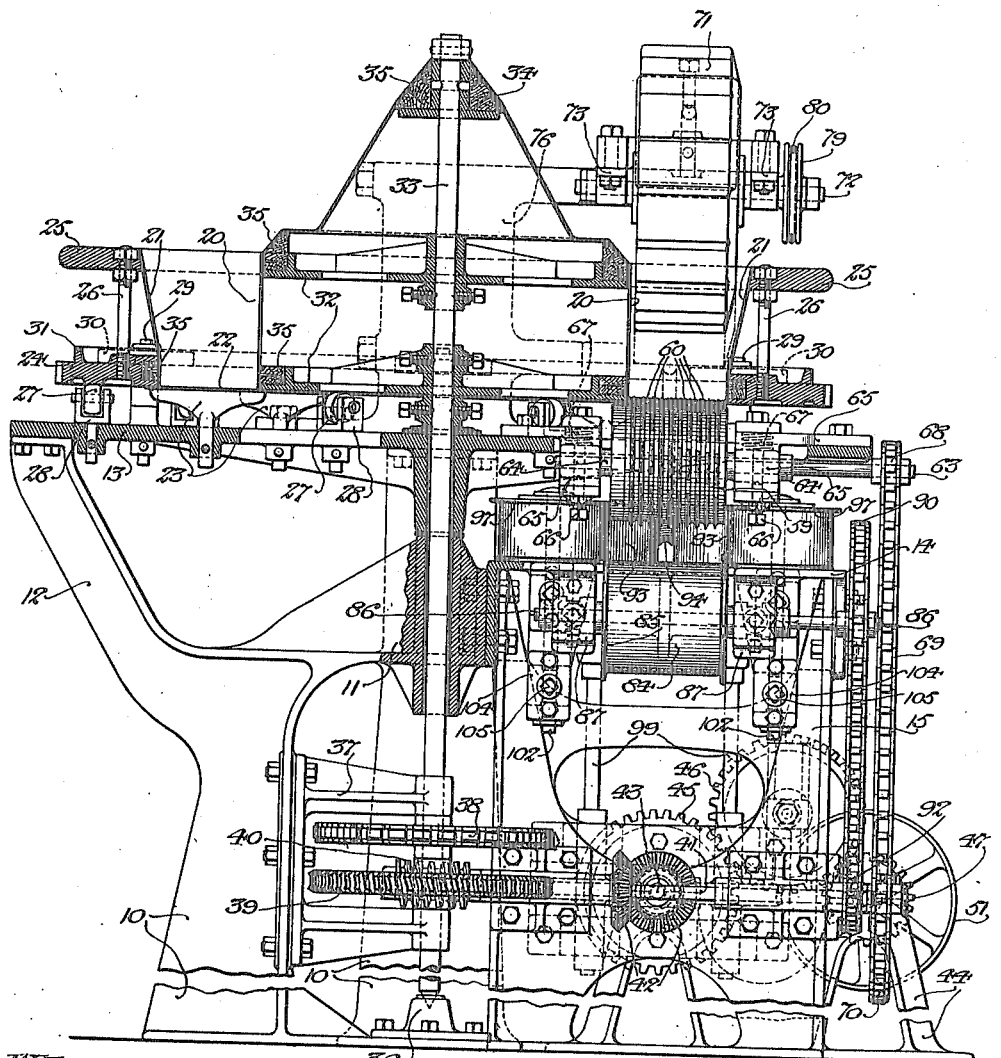

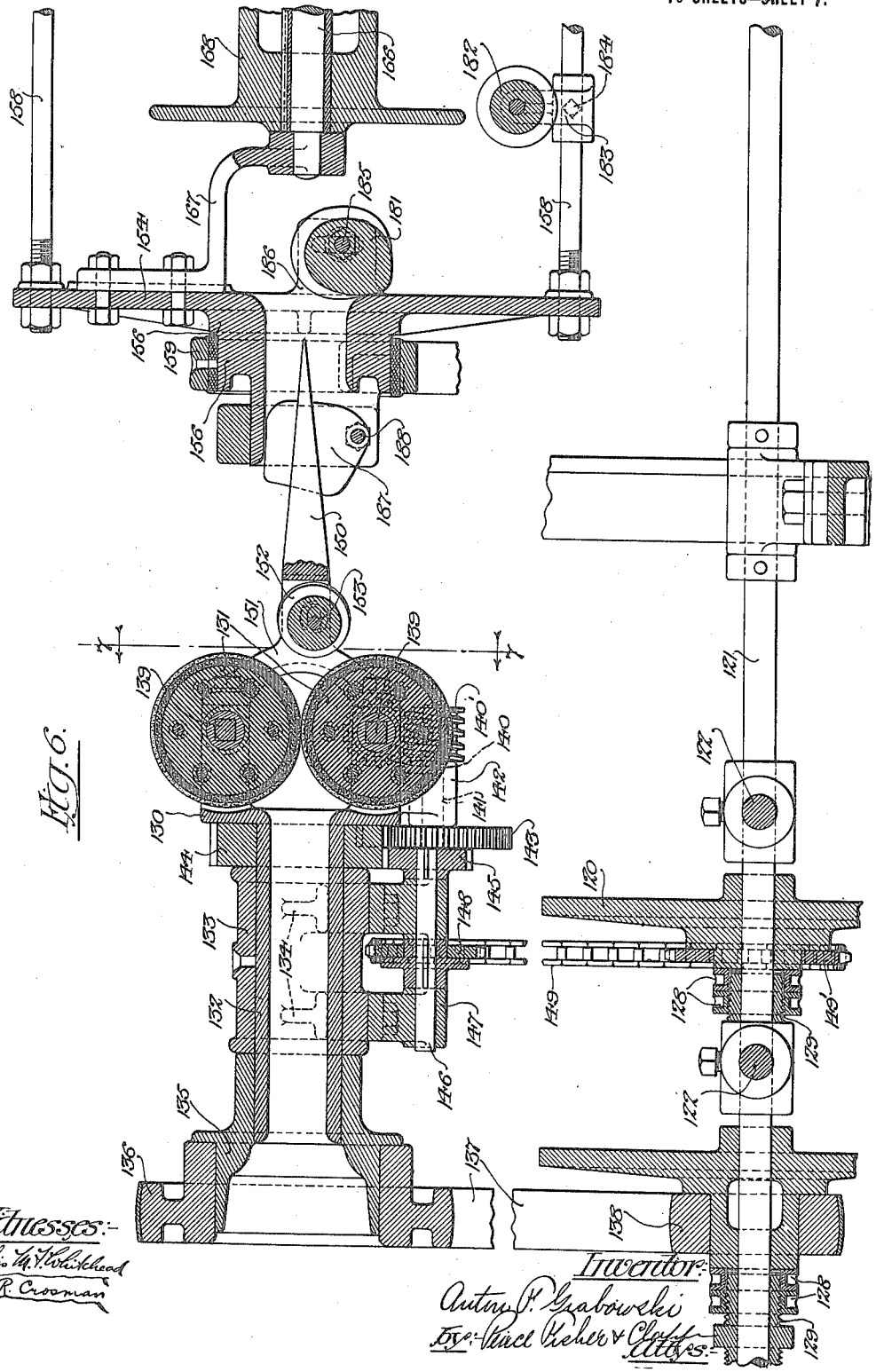

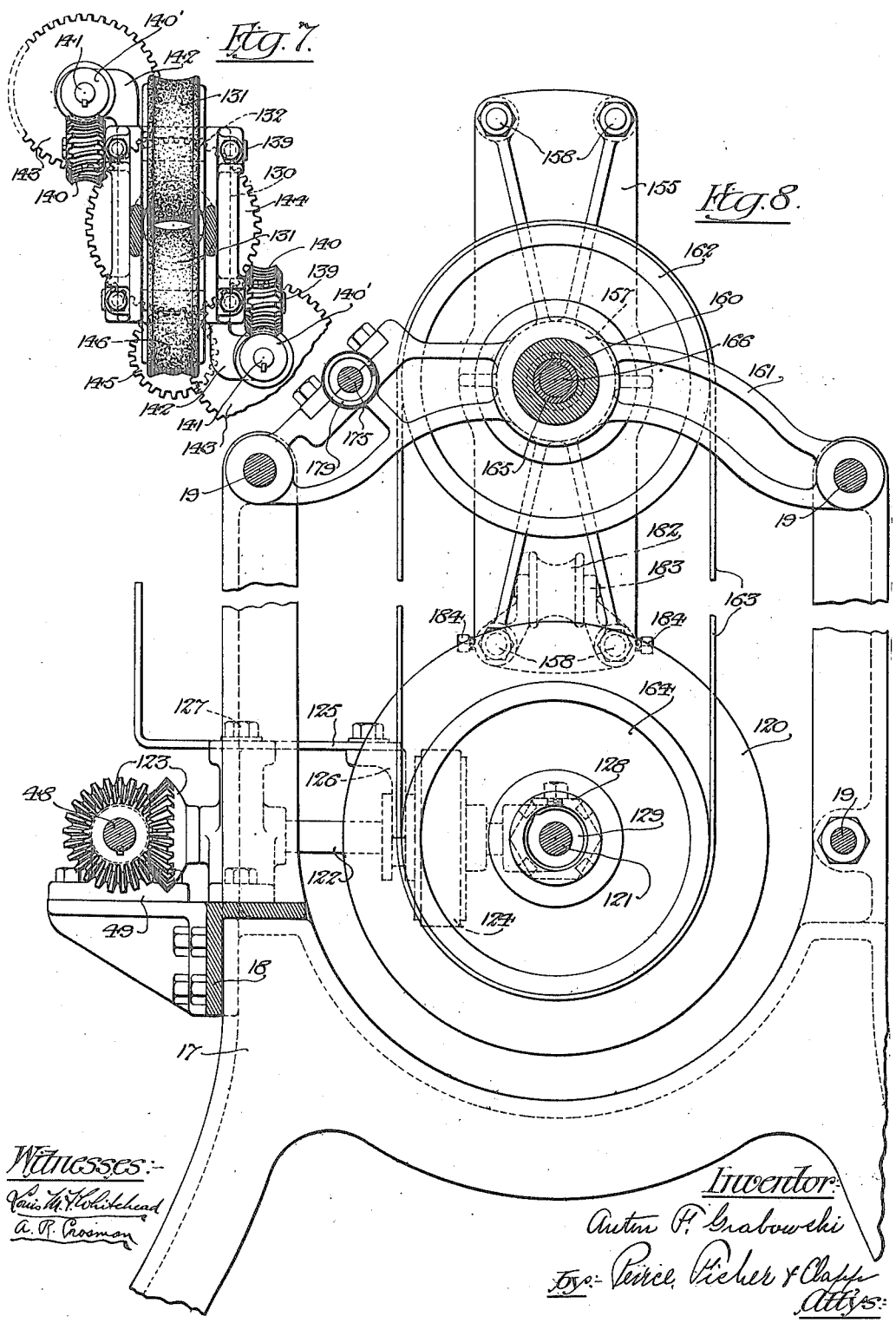

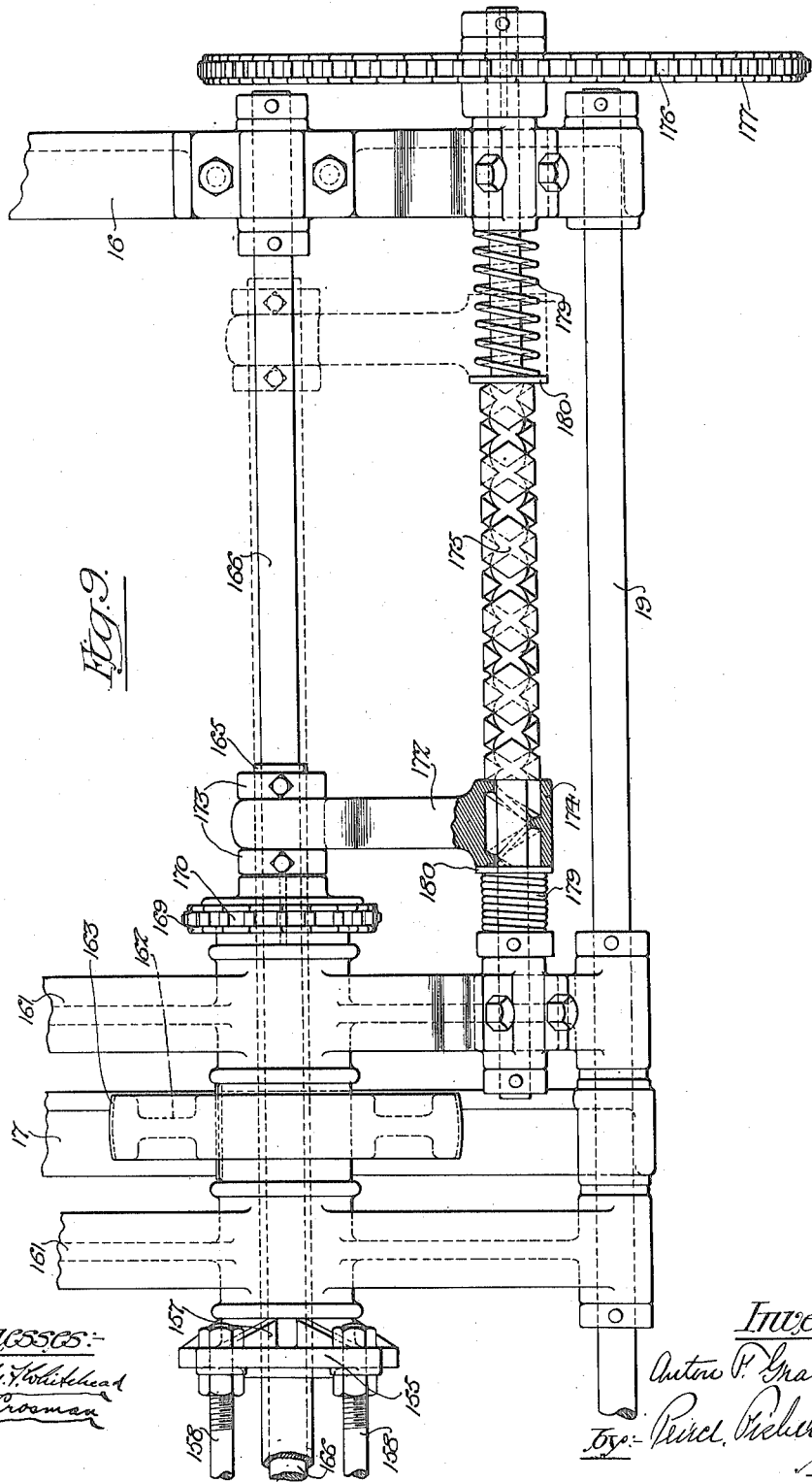

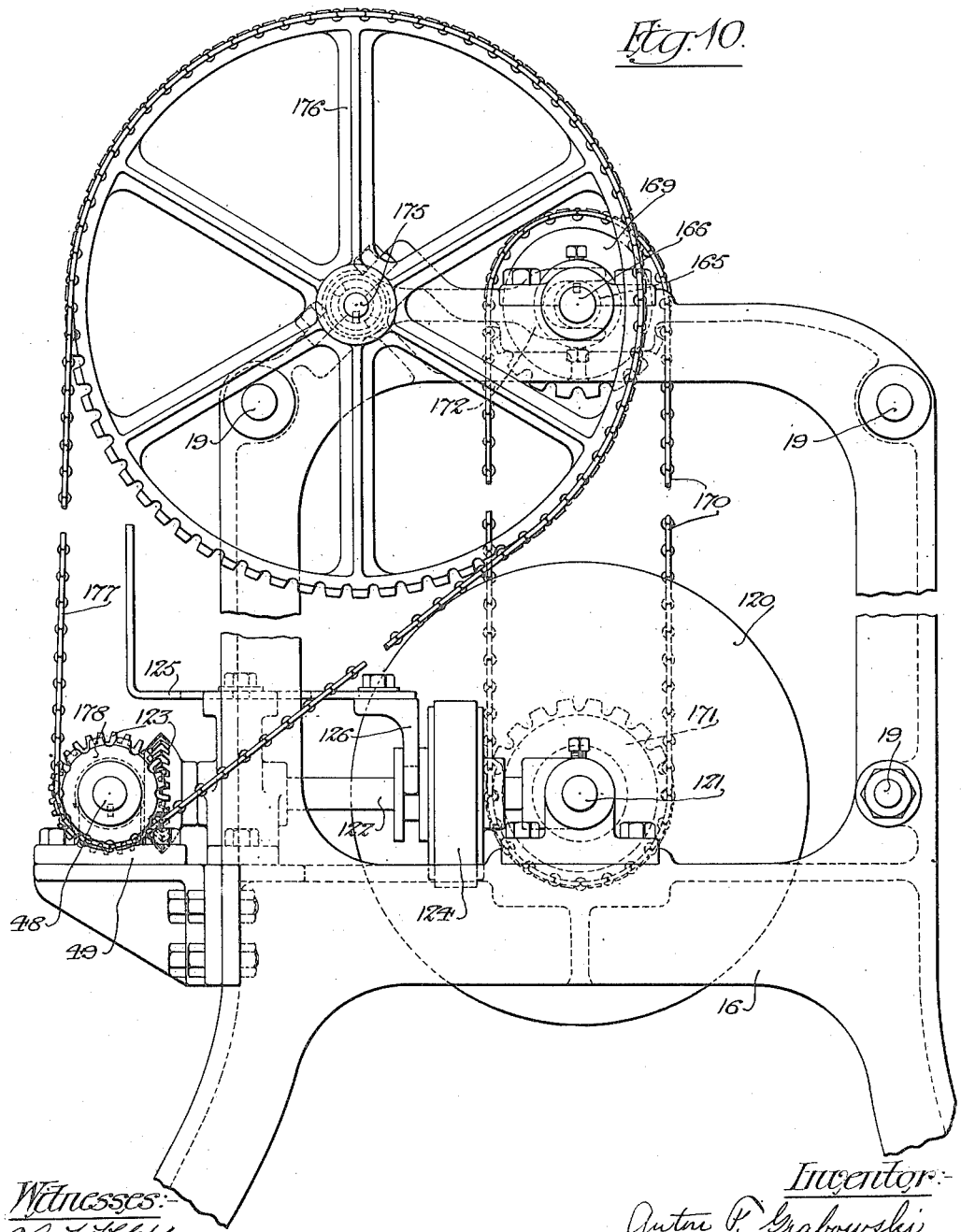

UNITED STATES PATENT OFFICE.

ANTON F. GRABOWSKI, OF CHICAGO, ILLINOIS.

HAIR-CURLING MACHINE.

1,255,410.　　　　Specification of Letters Patent.　　Patented Feb. 5, 1918.

Application filed March 8, 1915. Serial No. 13,071.

*To all whom it may concern:*

Be it known that I, ANTON F. GRABOWSKI, a citizen of the United States, and a resident of the city of Chicago, county of Cook, and State of Illinois, have invented certain new and useful Improvements in Hair-Curling Machines, of which the following is a full, clear, and exact description.

The invention relates to the manufacture of curled hair such as is employed for stuffing mattresses, cushions and the like, and more particularly the cheaper grades, such as is made from a mixture of horse hair, hair from the tails of cattle, and hog hair. In some grades, short staple vegetable fiber, which cannot be used for other purposes, is admixed with the hair. The mixed hair is curled by twisting it very tightly into a rope. The rope of tightly twisted hair is boiled and dried to set the curl and it is then picked apart to form the stuffing material. The mixed hair is, for the most part, and particularly in the cheaper grades, of quite short staple, and for that reason cannot be readily handled by machinery, and at present the curling of the hair by twisting it into a rope is effected by hand with the aid of a rotating spindle.

The present invention seeks to provide an improved machine for automatically feeding and twisting the hair and consists in features of improvement hereinafter set forth, illustrated in the preferred form in the accompanying drawings, and more particularly pointed out in the appended claims.

In the drawings, Figure 1 is a longitudinal section through the principal parts of the hair curling machine. Fig. 2 is a horizontal section through certain parts of the machine. Fig. 3 is a view in elevation on an enlarged scale of the left-hand end of the machine, illustrating the hopper and mechanism for feeding the hair to the twisting devices, the hopper being shown in section with parts broken away to show its construction. Fig. 3$^a$ is a view in elevation of the right hand portion of the machine showing the twisting mechanism, parts being shown in longitudinal section. Fig. 4 is a plan view of the parts shown in Fig. 3, portions of the feed hopper being broken away to illustrate its construction. Fig. 4$^a$ is a plan view of a portion of the machine intermediate the feeding and twisting mechanisms. Fig. 4$^b$ is a plan view of the twisting mechanism shown in elevation in Fig. 3$^a$. Fig. 5 is a cross section on the line 5—5 of Fig. 4. Fig. 6 is an enlarged longitudinal section of the principal parts of the twisting mechanism. Fig. 7 is a detailed section on the line 7—7 of Fig. 6. Fig. 8 is a cross section on the line 8—8 of Fig 4$^b$. Fig. 9 is a plan view of the mechanism for rotating and reciprocating the reel whereon the twisted hair rope is wound. Fig. 10 is a view in elevation of the right hand end of the machine.

In the improved machine, the mass of mixed hair is preferably placed within a hopper, from which it is delivered by a picker wheel or drum onto an endless conveyer or feed belt. The hair is deposited on the feed belt in a layer or bat, and, as it is advanced thereby the layer or bat of hair on the belt conveyer is concentrated into a sliver or strand, preferably by converging side belts and pressure rollers. One of the pressure rollers is arranged adjacent to the delivery end of the feed belt and a sliver or strand of hair passes therefrom to a rotating, twisting head whereby the portion of the strand between the head and the delivery end of the feeding belt is initially twisted. From the rotating or twisting head the strand or rope passes to a second twisting mechanism which is preferably in the form of a flier and which also serves to wind the rope upon a reel.

In the construction shown, the hopper and its operating mechanism are mounted upon a cast metal frame (see Figs. 3 and 5) comprising standards 10, a horizontal portion 11 and upwardly projecting arms or brackets 12, which support a bed plate 13. The feeding and concentrating devices are carried upon a bed plate 14 which is supported upon upright frames 15 and which is connected at its righthand end to the horizontal frame portion 11. The spinning and winding mechanisms are mounted upon a frame (see Figs. 3$^a$, 4$^a$ and 4$^b$) comprising end uprights or standards 16 and intermediate uprights or standards 17. At their front lower portions these standards are connected together by a horizontal angle bar 18, and, at their upper and rear portions they are connected together and to the feeder frame by horizontal tie rods 19.

The hopper in which the hair is placed is arranged to rotate about a vertical axis at the upper lefthand portion of the machine. The hopper is preferably annular and comprises rotatable inner and outer portions 20 and 21, and a fixed bottom 22. The latter is formed of sheet iron, and is secured to the upper ends of a series of T-shaped brackets 23 (see Figs. 3, 4 and 5) that arise from the bed plate 13. The walls of the inner and outer portions 20 and 21 are also preferably formed of sheet iron and the outer wall preferably tapers slightly from the upper to the lower portion of the hopper. This outer wall is secured at its lower edge to the inner edge of an annular flange or gear 24 and at its upper edge to an annular flange 25 that is supported on vertical bolts 26 arising from the flange or gear 24. This outer portion of the hopper is rotatably supported by a series of rollers 27 which are mounted in U-shaped brackets 28 on the bed plate 13 and engage a track on the under side of the annular flange or gear. The outer hopper portion is held against lateral movement by a series of guide rollers 29 which are mounted on shafts 30 rising from the bed plate and which engage the vertical shoulder or flange 31 on the upper face of the flange or gear 24 (see Figs. 3 and 4.)

The inner portion or wall 20 of the hopper is preferably cylindrical, and is secured to the edges of a pair of disks 32 that are fixed to an upright shaft 33. Preferably also, the inner portion has a conical upper end 20' which is fixed to a collar 34 on the upper end of the vertical shaft 33. For convenience in securing the sheet metal walls of the inner and outer hopper portions in place by nails or the like, the collar 34, the disks 32 and the annular gear or flange 24 are provided with wooden peripheral portions 35, and the flange 25 at the upper, outer portion of the hopper is also preferably formed of wood for this purpose.

Shaft 33 is journaled in suitable bearings formed in the bed plate 13 and the horizontal frame portion 11, and its extreme lower end is mounted in a bearing 36. The shaft is also preferably journaled in bearings formed in a U-shaped bracket 37 that is fixed to one of the standards 10. A sprocket wheel 38 and a worm gear 39 are mounted on the shaft 33 between the arms of the bracket 37 and the wheel 39 is engaged by a worm 40 (see Fig. 5) on the inner end of a horizontal countershaft 41. This shaft is journaled in suitable bearings mounted upon the adjacent upright or standard 15 and is connected by a pair of bevel gears 42 to the lefthand end of a driving shaft 43. The latter is journaled in suitable bearings in the upright frames 15 and at its extreme righthand end is also journaled in the upper end of an upright or standard 44. At its righthand end, the shaft 43 is provided with a gear wheel 45 (see Figs. 4ª and 5) which is connected by an intermediate idler 46 to a gear 47 on a main horizontal drive shaft 48. This shaft is journaled in the righthand standard 15, in the upright or standard 44 and also in suitable bearings 49 mounted upon the lower horizontal frame member 18 (see Figs. 3ª and 4ᵇ). The lefthand end of the main drive shaft 48 is provided with tight and loose pulleys 50 and 51, which are adapted to be connected by a belt to any suitable source of power.

The intermediate idler 46 (see Figs. 3 and 4ª) is carried by a block 52 which is vertically adjustable in a pair of upright guides 53. The latter are fixed at their lower ends to a bar 54 that extend between the shafts 43 and 48. By removing the idler 46 and substituting a larger or smaller idler, the block 52 can be adjusted to properly connect the gears 45 and 47, and, in this way, the speed of the shaft 43 can be varied relative to the speed of the main drive shaft 48.

The sprocket wheel 38 is connected by a chain 55 (see Figs. 3 and 4) with a sprocket wheel 56 on upright shaft 57. The latter is journaled in suitable bearings in the lefthand standard 10 and in the lefthand portion of the bed plate 13. Above the bed plate, this shaft is provided with a gear 58 which meshes with the teeth of the annular gear 24 to thereby drive the outer portion of the hopper. The driving connections between the shaft 33 and the outer portion of the hopper are such, that the inner and outer hopper portions rotate in unison. A body of hair placed between the inner and outer portions of the annular hopper is carried around over the stationary bottom portion 22 thereof and over a rotating, cylindrical picker wheel or drum 59, which is located beneath an opening in the stationary hopper bottom.

The picker wheel or drum is arranged within an opening in the bed plate 13 (see Figs. 3 and 5) and beneath an opening in the fixed hopper bottom. The opening in the hopper bottom is preferably provided with a grating 60 which is formed of a series of segmental bars and the cylindrical picker drum is provided with teeth or pins which project upwardly between the bars of the grating. The bars are preferably curved upwardly to a slight extent over the picker wheel, as most clearly shown in Fig. 3, and the free ends of these grate bars extend over a downturned lip 22' on the fixed hopper bottom 22. The opposite ends of the grate bars are integral with a cross bar 61 which is adjustably mounted on a supporting upright 62 that rises from the bed plate 13.

The picker wheel is mounted upon a shaft 63 which is journaled in bearings 64. The latter are mounted in vertical guide ways formed in brackets 65 that are fixed to the bed plate 13. The bearing boxes 64 rest upon adjusting screws 66 threaded through the lower portions of the bracket 65 and springs 67 interposed between the bearings and the upper portions of the brackets hold the bearings in engagement with the adjusting screws. The height of the picker wheel 59 and coöperating grating 60 relatively to the hopper may thus be adjusted as desired. The outer end of the shaft 63 is provided with a sprocket wheel 68 which is connected by a chain 69 to the large sprocket wheel 70 on the outer end of the counter shaft 41 (see Fig. 3). By this means the picker wheel is driven at very high speed relatively to the speed of movement of the rotating hopper.

The body of hair within the hopper is pressed downwardly upon the grating and the upper portion of the picker wheel by means of a presser wheel 71. This wheel is mounted upon a shaft 72 which is journaled in the free ends of a pair of rock arms 73. The latter are connected to the sleeve 74 which is mounted upon a horizontal pivot rod 75. The latter projects forward from an upright 76 (see Figs. 3 and 4) that rises from the righthand portion of the bed plate 13. An arm 77 fixed to the sleeve 74 projects toward the presser wheel 71 and is provided with an adjustable weight 78 so that the wheel is pressed down into the space between the inner and outer portions of the annular hopper and onto the body of material within the same. Inasmuch as the presser wheel is located directly over the picker wheel 59 and grate 60, it holds the material in snug engagement therewith and thereby aids in maintaining a uniform feed of the material from the hopper.

The presser wheel 71 is preferably positively driven, and for this purpose the outer end of the shaft 72 is provided with a pulley 79. A round belt 80 extends over this pulley, around a guide wheel 81 and over a driving pulley 82 on the upper end of the shaft 57. The guide pulley 81 is mounted upon a bracket 83 on the edge of the bed plate 13. The pulleys 81 and 82 are flanged and are of considerable width, so that the pressure wheel 71 is free to rise and fall. If desired, the periphery of the pressure wheel may be corrugated, as shown.

The hopper preferably rotates in the direction indicated by the arrow in Fig. 4, and the picker wheel or drum rotates in the direction indicated by the arrow in Fig. 3. The teeth of the picker drum are forwardly inclined and the hair is drawn from the hopper thereby and is projected downwardly and onto a horizontal feed belt 84. The picker drum is arranged above the receiving end of the conveyer 84 with its axis parallel thereto and substantially at right angles to the path of movement of the conveyer and serves to deliver a uniform layer of material on to the upper surface of the conveyer.

This conveyer passes over the upper surface of the table or bed 14 and, at the ends of the bed or table, it passes over a pair of flanged pulleys 85 carried respectively on shafts 86. One of these shafts is journaled in fixed bearings beneath the bed or table 14 and the other (the lefthand shaft in the construction shown) is mounted in adjustable bearings so that the belt may be held under proper tension. As shown, these adjustable bearings are mounted to slide in guide ways 87, and are adapted to be adjusted by screws 88 and are held in engagement with the adjusting screws by springs 89. A large sprocket 90 on the outer end of the lefthand shaft 86 is connected by a chain 91 to a small spocket wheel 92 on the counter shaft 41. By this means the feed belt 84 is driven toward the righthand end of the machine to advance the hair deposited thereon by the picker wheel 59.

The layer or bat of hair deposited upon the feed belt 84 is concentrated into a sliver or strand by a pair of vertically disposed belts 93 and a pair of presser rolls 94 and 95. There are two side belts 93 which are disposed on edge above the horizontal feed plate 84, the lower edges of the vertical belts being closely adjacent or substantially in contact with the upper face of the horizontal belt. The vertical belts pass over driving and guide rollers 96 and 97 and the intermediate inner portions of the belts also pass over a pair of intermediate guide rollers 98.

The drive rollers 96 at the righthand ends of the belts are mounted upon the upper ends of a pair of shafts 99 that are journaled in suitable bearings upon the bed plate 14 and upon the righthand standard 15. At their lower ends, the shafts 99 are provided with worm wheels 100 which mesh with a worm 101 on the shaft 43. The rollers 97 at the lefthand ends of the belts are mounted upon upright shafts 102 which are journaled in bearing blocks 103. The latter are horizontally adjustable in guide-ways formed in brackets 104 on the bed or table 14. Adjusting screws 105 serve to position the blocks 103 and hold the side belts 93 under proper tension.

The pair of rollers 97 are spaced quite far apart (see Fig. 4), but the pairs of rollers 98 and 96 are arranged closely adjacent, so that the inner portions of the belts 93 are inclined toward each other from the receiving to the delivery end of the main feed belt 84, and between the rollers 98 and 96 the inner portions of the belts 93 are substantially parallel. To hold these inner portions of the belts adjacent each other and substantially parallel, a pair of guide plates 106 therefor are carried upon the ends of a pair of brackets 107. The outer portions of these brackets are transversely slotted and bolts 108 extending therethrough adjustably secure these brackets and guide plates to the bed or table 14. It will be understood that the inner portions of the brackets 107 extend inwardly over the horizontal feed belt 84.

The presser roll 94 is located between the closely adjacent portions of the side belts 93 and between the guide plates 106. This presser roll is mounted on a shaft 109 which is journaled in the right hand ends of a pair of arm 110. The latter are fixed to a sleeve 111 that is mounted upon a pivot rod 112. This pivot rod projects laterally from the upright 76. An arm 113 fixed to the sleeve 111 projects outwardly toward the presser roll 94 and carries an adjustable weight 114 so that the presser roll is pressed downwardly upon the strand or sliver of hair on the horizontal feed belt 84 and between the side belts 93. Inasmuch as the guide plates 106 are arranged on opposite sides of the presser roll 94 they prevent the pressure exerted by the roll from deflecting the belts.

The rollers 96, 97 and 98 which coöperate with the vertical concentrating belts 23 are provided with flanges which engage the upper edges of the belts and hold the latter against displacement in vertical direction.

The second presser roll 95 is arranged above the delivery end of the horizontal feed belt, and preferably directly above the right hand end roller 85. This roller is mounted on a shaft 115 which is carried between the outer ends of a pair of arms 116, the inner ends of which are pivotally mounted on the shaft 109. The U-shaped portion 117 connects the arms 116 and an arm 118 fixed to the U portion 117 projects outwardly toward the roller 95 and is provided with an adjustable weight 119. The peripheral surfaces of the presser rolls 94 and 95 are preferably concave, as most clearly shown in Fig. 4.

From the feeding and concentrating devices the strand of hair passes to the twisting and reeling mechanisms. The parts of these mechanisms are preferably driven by a series of friction disks 120 (see Figs. 3ª, 4ᵇ, 6 and 8), which are loosely mounted upon a fixed supporting shaft 121. This fixed shaft is mounted in suitable supporting brackets upon the standards 15 and 16 and upon the left hand standard 17. These disks are independently driven from the main drive shaft 48 by a series of short counter-shafts 122 which are journaled in suitable bearings mounted respectively upon the fixed shaft 121 and upon the horizontal frame member 18. The shafts 122 are connected at their outer ends by pairs of beveled gears 123 to the drive shaft 48. A driving friction roller 124 (see Figs. 4ᵇ and 8) is mounted upon the inner portion of each of these shafts and these rollers engage and drive the friction disks 120. The friction rollers are keyed to the shafts 122 but can be adjusted longitudinally thereon to vary the speed at which the different friction disks are driven. For this purpose, each roller is provided with an adjusting bar 125, having a fork 126 secured to its inner end that engages an annular groove formed in the hub of the roller. The outer end of each adjusting bar 125 is upturned to form a convenient handle. A clamp bolt 127 extends through a longitudinal slot in the bar and into the bearing bracket at the outer end of the adjacent shaft 122, and serves to hold the friction roller 124 in adjusted position. The disks 120 are held in snug frictional engagement with the driving rollers 124 by nuts 128 (see Figs. 3ª and 6), which are adjustably threaded on sleeves or collars 129 on the shaft 121.

The strand of hair is initially twisted by a rotating head 130 having a pair of feed rollers 131 mounted thereon on opposite sides of its axis and which are arranged to grip the strand between them. The twisting head 130 is carried upon the end of a sleeve 132 which is journaled in a bearing 133. The latter is carried by supporting arms 134 (see Fig. 4ᵇ) which are sustained by the horizontal tie rods or supports 19. A hollow part 135 fixed to the opposite or left hand end of the sleeve 132 abuts against the bearing 133 and carries a pulley 136. A belt 137 passes over this pulley and over pulley 138 that is fixed to the hub of one of the friction disks 120. The twisting head and rollers 131 thereon are thus rotated so that the portion of the strand of hair which extends between the rollers 131 and the presser roller 95 at the end of the feeder, is initially twisted.

The feed rollers 131 of the twisting head are provided with concave gripping surfaces (see Figs. 6 and 7) and are preferably rubber covered so that they will securely grip the strand of hair. They are also positively driven to advance the strand, and for this purpose they are mounted upon short transverse shafts 139 that are journaled in the sides of the twisting head and each of which is provided upon one end with a worm wheel 140. These worm wheels engage worms 140' that are mounted upon the right hand ends of short longitudinally extending shafts 141. These shafts are journaled in bearings 142 that project from the twisting head and spur gears 143 mounted upon the left hand ends of the shafts 141 engage a gear 144 that is mounted upon the sleeve 132 between the head 130 and the bearing 133.

The rollers 131 can be rotated by fixing the gear 144 in position, but this gear is preferably driven from one of the friction disks 120 so that the speed of rotation of the feed rollers 131 can be controlled as desired relatively to the speed of rotation of the twisting head. For this purpose, the gear 144 is driven by a pinion 145 on the righthand end of a short longitudinally extending shaft 146. The latter is journaled in a pair of brackets 147 that are fixed to and depend from the under face of the bearing 133. A sprocket wheel 148 on this shaft is connected by a chain 149 to a sprocket wheel 149' upon one of the friction disks 120. The feed rollers 131 grip the strand between them at the axis of the rotating head and thus hold the strand in axial position out of frictional contact with the sleeve 132.

From the twisting head, the strand passes to a second twisting mechanism, which is preferably in the form of a revolving flier which also serves to wind the strand upon a reel. Preferably also the strand as it leaves the initial twisting rollers 131, passes over a tapered horn 150 which is mounted on the twisting head in line with the axis thereof. Preferably, as shown, the horn is formed in one piece with a forked bracket 151 by which it is secured to the head, as most clearly shown in Figs. 3$^a$, 4$^b$ and 6. At its inner end adjacent the bite of the rollers 131 the horn is provided with an inclined guide which directs the strand of hair onto the periphery of the larger lefthand end of the horn. In the construction shown, this guide is in the form of a roller 152, which is arranged between the members of the forked bracket 151 and is rotatably mounted upon a short transverse shaft 153 journaled in the bracket. This roller is provided with a concave surface and guides the strand of hair so that it is coiled a few times about the horn, as shown in Figs. 1 and 3$^a$.

The twisting flier comprises left- and right-hand cross arms 154 and 155, having central hub portions 156 and 157 respectively, and which are connected at their ends by horizontal tie rods 158. The hub portion 156 of the lefthand cross arm 154 of the flier is hollow and is journaled in a suitable bearing in a cross support 159 that extends between the longitudinal frame rods 19. The hub 157 of the righthand cross arm of the twisting flier is fixed to the end of a hollow shaft 160 that is journaled in a pair of cross supports 161 extending between the rods 19. A pulley 162 on the shaft 160 is connected by a belt 163 to a pulley 164 that is fixed to the hub of one of the friction disks 120.

Within the hollow shaft 160 is arranged a sleeve 165 and a shaft 166. This shaft is carried at its outer end upon the righthand standard 16 and at its inner end by a bracket 167 that is fixed to the lefthand cross arm 154 of the twisting flier. A reel 168, whereon the twisted rope of hair is wound is mounted upon the inner end of the sleeve 165 and a sprocket wheel 169 is mounted upon the outer end of the sleeve. This sprocket wheel is connected by a chain 170 to a sprocket wheel 171 on the righthand friction disk 120. The sprocket wheel 169 is keyed to the sleeve 166 to rotate it and the reel 168, but the sleeve and reel can be moved longitudinally in order to properly wind the rope upon the reel.

For this purpose, the forked inner end of an arm 172 (see Figs. 4$^b$ and 9) extends between a pair of collars 173 on the righthand end of the sleeve 165 and at its outer end, the arm 172 is provided with a nut 174 which engages a feed screw 175 having right- and lefthand threads formed thereon. This feed screw is journaled in suitable bearings formed in one of the cross bars 161 and in the upper portion of the righthand standard 16. A large sprocket wheel 176 (see Figs. 9 and 10) on the outer end of this feed screw is connected by a chain 177 to a small sprocket wheel 178 on the righthand end of the drive shaft 48. Springs 179 are coiled about the unthreaded end portions of the feed screw 175 and engage washers 180 thereon. These springs and washers coöperate to engage the nut 174 upon the outer end of the arm 172 with the threads of the screw, and the latter serves to reciprocate the sleeve 165 and the reel 168 mounted thereon.

The horn 150 of the twisting head extends well within the hollow bore of the hub 156 of the twisting flier, and the strand or rope of hair passes from the end of the horn over an axially disposed guide 181 on the flier, thence outwardly and over a pair of guide rollers 182 and then to the reel or spool 168. The rollers 182 are rotatably mounted on brackets 183 which are mounted upon the longitudinal rods 158 of the flier and extend inwardly therefrom. Set screws 184 hold the brackets 183 in position. The guide 181 and the rollers 182 are provided with concave peripheral surfaces and the guide is held in position by a clamp bolt 185 which extends through a pair of lugs 186 on the inner face of the cross arm 154. If desired, the openings in the lugs 186, for receiving the clamp bolt 185 may be extended in transverse direction so that the guide 181 can be adjusted. The body of the guide, as most clearly shown in Fig. 6, is of irregular outline and abuts against the inner face of the cross arm 154 so that it is held against movement. The portion, however, of the guide that engages the rope or strand of hair is substantially circular. As the rope or strand of hair passes over the end of the horn and over the guide 181, a final tight twist is imparted to it.

When the reel 168 is full it may be readily removed from the flier by disengaging the end of the shaft 166 from the bracket 167 and withdrawing the shaft and the sleeve 165 from the reel.

In operation, the mass of short staple mixed hair is placed within the annular hopper and is kept fairly level therein to thereby aid in keeping the feed uniform. The hopper revolves slowly to carry the body of hair over the grate 60 and picker wheel 59. The latter revolves at high speed and withdraws the hair from the hopper and projects it onto the feed belt 84 in a bat or layer, and at the same time combs or straightens out the hair fibers and lays them lengthwise upon the feed belt. The pressure roller 71 maintains a uniform pressure upon the body of hair above the picker wheel so that the feed is uniform. The picker wheel and grate can be adjusted vertically, as described, relatively to one another in accordance with the different grades of mixed hair operated upon.

As the layer or bat of hair is advanced by the horizontal feed belt 84, it is condensed or compressed laterally by the vertical side belts 93. The speed of movement of these side belts is substantially the same as that of the horizontal feed belt 84, so that the layer is concentrated into a strand or sliver. The short hair fibers, however, particularly in moist weather, would be apt to stick to stationary concentrating devices, such as trumpets, funnels and the like, but in the applicant's machine, the concentration is effected by the moving, vertical belts 93 aided by the compression roller 94 acting between the closely adjacent portions of the belts and between the guide plates 106.

The presser roll 95 prevents the strand or sliver of hair upon the belt from being twisted, but the portion of the strand between the end of the feed belt and the rollers 131 of the rotating head 130 is initially twisted so that the fibers hang together and properly bridge the gap between the feed belt and the feed rollers of the twisting head.

The peripheral speed of the rollers 131 of the twisting head is slightly faster than that of the feed belt 84 so that a little tension is placed upon the portion of the hair strand between the feed belt and the rollers. It should be noted that, in the construction set forth, the hair in the hopper and in the parts of the feeding, concentrating and twisting devices is positively engaged and advanced so that it will not stick or bridge and so that a uniform feeding and twisting is effected. Attention is also called to the fact that as the hair passes through the strand forming, compressing and initial twisting devices, it is, in the preferred construction shown only in contact with forwardly moving parts so that there is no friction developed to interfere with the proper advanced movement of the hair.

The flier by which the strand of hair is finally twisted or kinked to properly curl it, rotates at a considerably greater speed than the twisting head, so that, as the strand passes over the horn 150 of the twisting head and into the flier, a final hard twist or kinked condition is imparted thereto. The horn 150 of the twisting head projects, as stated, into the bore of the hub 156 of the flier, and preferably an inclined guide plate 187 (see Figs. 4ᵇ and 6) is arranged within the mouth of the bore on one side of the hub. This plate is held in place by a cross-bolt 188 shown in Figs. 3ᵃ and 6. The speed of rotation of the reel is slightly greater than that of the flier, so that as the rope is formed, it is wound upon a reel. As the layers of rope are wound upon the reel, the speed of the reel is reduced by adjusting the corresponding friction drive roll, so that excessive tension is not placed upon the strand or rope of hair as it accumulates upon the reel.

The improved machine effects the uniform feed of the short mixed hair and forms a rope of uniform size which is uniformly tightly twisted and kinked, and the hair is thereby properly and uniformly curled, the curl being "set" by boiling and drying the hair, as stated. It is necessary to vary the speed of the parts of the machine in accordance with the varying grades of hair operated upon, and also in accordance with the varying atmospheric conditions. The speed of the feeding mechanism relatively to the twisting mechanism can be effected by changing the idle gear 46 which connects the main drive shaft 48 with the drive shaft 43 of the feeding mechanism. The speed of rotation of the twisting head and twisting flier, and the peripheral speed of the feed rollers of the twisting head can be readily varied as desired during the operation of the machine by adjusting the drive rollers that coöperate with the friction disks.

It is obvious that numerous changes may be made in the details set forth without departure from the essentials of the invention as defined in the claims and that parts may be taken without its adoption in entirety.

I claim as my invention:—

1. In a hair curling machine, the combination of an endless conveyer, a hopper, picker mechanism for withdrawing the material from said hopper and depositing the same in a layer directly upon said conveyer, devices for concentrating the layer of material as it is advanced by said conveyer into a strand and for compressing the strand at the delivery end of said conveyer, and a rotary twisting head having means thereon for engaging and advancing the strand to thereby twist the portion of the strand between said head and said strand compressing devices.

2. In a hair curling machine, the combination of an endless conveyer, a hopper, picker mechanism for withdrawing the material from said hopper and depositing the same in a layer directly upon said conveyer, devices for concentrating the layer of material as it is advanced by said conveyer into a strand and for compressing the strand at the delivery end of said conveyer, a rotary twisting head having means thereon for engaging and advancing the strand and thereby initially twisting the portion of the strand between said head and said strand compressing devices and a second twisting mechanism for receiving the strand from said head and finally twisting or kinking the same.

3. In a hair curling machine, the combination of feed mechanism for advancing a layer of material, devices for concentrating the layer into a strand and for compresssing the strand, a rotary twisting head having means thereon for gripping and advancing the strand and arranged to initially twist the portion of the strand between said gripping means and said strand compressing devices, a second rotary twisting mechanism for withdrawing and finally twisting or kinking the strand from said head and drive mechanism arranged to rotate said second twisting mechanism faster than but in the same direction as said head.

4. In a hair curling machine, the combination of feed mechanism for advancing a layer of material, devices for concentrating the layer into a strand and for compressing the strand, a rotary twisting head having feed rolls thereon for gripping and advancing the strand axially through said head and arranged to initially twist the portion of the strand between said feed rolls and said strand compressing devices, a rotary twisting flier for receiving and finally kinking the strand from said head, a reel whereon the strand is wound by said flier, and drive mechanism for said head, feed rolls, flier and reel arranged to rotate said flier faster than said head and to rotate said reel slightly faster than said flier.

5. In a hair curling machine, the combination with a feeder for advancing a layer of material and devices for concentrating and compressing the layer into a strand, of a rotary twisting head for receiving and twisting the strand, said head having feed rolls for gripping the strand between them, and said head having an axial tapered horn over which the strand from said rolls passes, and a rotary twisting flier, and a reel whereon the strand is wound by said flier, said flier having eccentric guides for directing the strand as it leaves the horn of said twisting head, and coöperating with said horn to finally twist or kink the strand, substantially as described.

6. In a hair curling machine, the combination with a feeder for advancing a layer of material and devices for concentrating and compressing the layer into a strand, of a rotary twisting head for receiving and twisting the strand, said head having feed rolls thereon for gripping the strand between them, and said head having an axial tapered horn over which the strand passes as it leaves said rolls, and a rotating twisting flier for withdrawing and finally twisting the strand from said head, said flier having a hollow hub at one end into which said horn extends, substantially as described.

7. In a hair curling machine, the combination of a feeder for advancing a layer of material, devices for concentrating and compressing the layer into a strand, a rotary twisting head for initially twisting the strand having feed rolls thereon for gripping the strand between them, said head having an axial tapered horn about which the strand passes spirally as it leaves said rolls, a rotary twisting flier for receiving and finally twisting or kinking the strand as it leaves said horn, a reel whereon the strand is wound by said flier, and mechanism for driving said head, feed rolls, flier and reel, substantially as described.

8. In a hair curling machine, the combination of feed mechanism comprising a hopper, a conveyer, a picker for withdrawing the material from said hopper and depositing the same in a layer directly on said conveyer, and devices for concentrating and compressing the layer of material into a strand, strand twisting mechanism, driving means for said feeding and strand twisting mechanisms, and means for varying the relative speed of operation of said mechanisms, substantially as described.

9. In a hair curling mechanism, the combination with a feeder for advancing a layer of material and devices for concentrating and compressing the layer into a strand, of a rotary strand twisting head having feed rolls thereon having smooth, yielding working faces, for gripping the strand between them, at the axis of said head, and separate, variable speed driving devices for said head and said feed rolls, substantially as described.

10. In a hair curling mechanism, the combination with a feeder for advancing a layer of material and devices for concentrating and compressing the layer into a strand, of a rotary head for initially twisting a portion of the strand between said compressing devices and said head having feed rolls thereon for gripping the strand between them, a second twister for withdrawing and finally twisting the strand from said head, and separate variable speed driving devices for said head and said second twister, substantially as described.

11. In a hair curling mechanism, the combination with a feeder for advancing a layer of material and devices for concentrating and compressing the layer into a strand, of a rotary strand twisting head having feed rolls thereon for gripping the strand between them, a second rotary twister for withdrawing and twisting the strand from said head, and drive mechanism having means for varying the speed of said feeder relative to that of said twisters and having means for varying the relative speeds of said twisters, substantially as described.

12. In a hair curling machine, the combination with a feeder for advancing a layer of material and devices for concentrating and compressing the layer into a strand, of a rotary twisting head through which the strand passes in axial direction, a pair of rolls mounted on said head on opposite sides of the axis thereof and having smooth working faces for gripping the strand between them at the axis of said head, a gear concentric with said head, two shafts eccentrically mounted on said head and operatively connected to said gear and to said rolls, means for rotating said head and means for rotating said gear, substantially as described.

13. In a hair curling machine, the combination of a conveyer belt for advancing a layer of material, devices above said belt for concentrating the layer thereon into a strand, a pressure device at the delivery end of said belt for compressing the strand, and a rotary head for receiving and twisting the portion of the strand between the same and said pressure device, said head having rolls for gripping the strand between them at the axis of said head, substantially as described.

14. In a hair curling machine, the combination of a conveyer belt for advancing a layer of material, devices above said belt for concentrating the layer thereon into a strand, a pressure roll above the delivery end of said belt coöperating therewith to compress the strand, a rotary twisting head, and rolls on said head for gripping the strand between them and thereby twist the portion of the strand between said pressure roll and the rolls of said head, substantially as described.

15. In a hair curling machine, the combination of a conveyer belt for advancing a layer of material, devices above said belt for concentrating the layer thereon into a strand, a pressure roll above the delivery end of said belt and coöperating therewith to compress the strand, a rotary twister head having feed rolls thereon for gripping the strand and thereby twisting the portion of the strand between them and said pressure roll, and a second rotary twister for withdrawing and finally twisting or kinking the strand from said head, and drive mechanism for said head.

16. In a hair curling machine, the combination of a hopper, a conveyer belt, a picker for withdrawing the material from said hopper and depositing the same in a layer on said belt, devices above said belt for concentrating and compressing the layer thereon into a strand, and a rotary twister head having positively driven feed rolls for gripping the strand between them, and means for withdrawing the strand from said head, substantially as described.

17. In a hair curling machine, the combination of a hopper, a conveyer belt, a picker for withdrawing material from said hopper and depositing the same in a layer on said belt, devices above said belt for concentrating the layer thereon into a strand, a pressure wheel above the delivery end of said belt for compressing the strand, a rotary twisting head for receiving and twisting the strand, and means for withdrawing the strand from said head, substantially as described.

18. In a hair curling machine, the combination of a hopper, a conveyer belt, a picker for withdrawing material from said hopper and depositing the same in a layer on said belt, devices above said belt for concentrating the layer thereon into a strand, a pressure wheel above the delivery end of said belt for compressing the strand, a rotary twisting head having feed rolls thereon gripping the strand between them to thereby twist the portion of the strand between said feed rolls and said pressure roll, and a second rotary twister for withdrawing and twisting the strand from said head, substantially as described.

19. In a hair curling machine, the combination of a conveyer belt advancing a layer of material, a pair of converging belts above said conveyer belt for concentrating the latter thereon into a strand, means for driving said belts, and means for engaging and twisting the strand delivered by said belts, substantially as described.

20. In a hair curling machine, the combination of a conveyer belt advancing a layer of material, a pair of converging belts above said conveyer belt for concentrating the latter thereon into a strand, means for driving said belts, a pressure device at the delivery ends of said belts for compressing the strand, and a rotary head having means for engaging and twisting the strand, substantially as described.

21. In a hair curling machine, the combination of a conveyer belt advancing a layer of material, a pair of converging belts above said conveyer belt for concentrating the latter thereon into a strand, means for driving said belts, means at the delivery ends of said belts for compressing the strand, a rotary twister head having feed rolls for gripping the strand, and means for withdrawing the twisted strand from said head, substantially as described.

22. In a hair curling machine, the combination of a conveyer belt for advancing a layer of material, a pair of converging belts above said conveyer belt for concentrating the layer into a strand, a pressure roll at the delivery ends of said belts for compressing the strand, a rotary twister for the strand, and means for driving said belts and said twister, substantially as described.

23. In a hair curling machine, the combination of a conveyer belt for advancing a layer of material, a pair of converging belts above said conveyer belt for concentrating the layer into a strand, a pressure roll at the delivery ends of said belts for compressing the strand, a rotary twisting head having a pair of feed rolls for gripping the strand between them, means for driving said belts, said head and said feed rolls, and means for withdrawing the twisted strand from said head, substantially as described.

24. In a hair curling machine, the combination of a conveyer belt for advancing a layer of material, a pair of converging belts above said conveyer belt for concentrating the layer into a strand, a pressure roll at the delivery ends of said belts for compressing the strand, a rotary twisting head having a pair of feed rolls for gripping the strand and twisting the portion thereof between said rolls and said pressure roll, a second twister for withdrawing and further twisting the strand from said head, and means for driving said belts, said twisters and said feed rolls, substantially as described.

25. In a hair curling machine, the combination of a conveyer belt for advancing a layer of material, a pair of converging belts arranged on edge above said conveyer belt for concentrating the layer thereon into a strand, guides for maintaining the adjacent portions of the latter belts substantially parallel, a pressure roller arranged between said adjacent parallel belt portions, means for driving said belts, and means for twisting the strand delivered thereby, substantially as described.

26. In a hair curling machine, the combination of a conveyer belt for advancing a layer of material, a pair of converging belts arranged on edge above said conveyer belt for concentrating the layer thereon into a strand, guide rollers and plates for maintaining the adjacent portion of the latter belts substantially parallel, a pressure roller arranged between said adjacent parallel belt portions, a rotary twisting head having feed rolls for gripping the strand between them, means for driving said belts, said twisting head and said feed rolls and means for withdrawing the twisted strand from said head, substantially as described.

27. In a hair curling machine, the combination of a conveyer belt for advancing a layer of material, a pair of converging belts arranged on edge above said conveyer belt for concentrating the layer thereon into a strand, guides for maintaining the adjacent portions of said belts substantially parallel, a pressure roller between said adjacent parallel belt portions, a second pressure roller above the delivery end of said conveyer belt, a rotary twisting head for engaging and twisting the strand delivered by said belts, and means for driving said belts and said head, substantially as described.

28. In a hair curling machine, the combination of a hopper, a conveyer belt, a picker for withdrawing material from said hopper and delivering the same in a layer to said conveyer belt, a pair of converging belts above said conveyer belt for concentrating the layer into a strand, a pressure device at the delivery end of said belts for engaging the strand, a rotary twisting head having feed rolls for engaging and twisting the strand, and means for driving said picker, belts, twisting head and feed rolls, substantially as described.

29. In a hair curling machine, the combination of a hopper, a conveyer belt, a picker for withdrawing material from said hopper and delivering the same in a layer to said conveyer belt, a pair of converging belts above said conveyer belt for concentrating the layer into a strand, a pressure roll for engaging the strand between the converging portions of said latter belts, means for driving said picker and said belt, and means for twisting the strand delivered thereby, substantially as described.

30. In a hair curling machine, the combination of a hopper, a conveyer belt, a picker for withdrawing material from said hopper and delivering the same in a layer to said conveyer belt, a pair of converging belts above said conveyer belt for concentrating the layer into a strand, a pressure roll for engaging the strand at the delivery ends of said belts, a rotary head having a pair of feed rolls for gripping the strand between them and twisting the portion of the strand between said feed rolls and said pressure roll, a second twister for withdrawing and further twisting the strand from said head, and means for driving said picker, said belts, said twisters and said feed rolls, substantially as described.

31. In a hair curling machine, the combination of a hopper having a discharge opening, a belt conveyer, a rotary toothed picker wheel operating through the opening in said hopper for withdrawing material therefrom and depositing the same in a layer on said belt conveyer, devices for concentrating and compressing the layer of material into a strand, and a rotary twisting head having means for gripping and advancing the strand, substantially as described.

32. In a hair curling machine, the combination of a hopper having a discharge opening, a conveyer, a rotary toothed picker wheel operating through the opening in said hopper for withdrawing material therefrom and depositing the same in a layer on said conveyer, devices above said conveyer for concentrating and compressing the layer thereon into a strand, a rotary twisting head having feed rolls for gripping the strand between them, means for driving said picker wheel, said conveyer, said head and said feed rolls, and means for withdrawing the twisted strand from said head, substantially as described.

33. In a hair curling machine, the combination of a hopper having a discharge opening a conveyer, a rotary toothed picker wheel operating through the opening in said hopper for withdrawing material therefrom and depositing the same in a layer on said conveyer, means for pressing the material in said hopper against said picker wheel, devices above said conveyer for concentrating the layer thereon into a strand, a rotary twisting head having means for engaging and advancing the strand, and means for withdrawing the twisted strand from said head, substantially as described.

34. In a hair curling machine the combination of a hopper having a grated opening therein, a conveyer belt, a rotary toothed picker wheel operating through said grated opening for withdrawing material from said hopper and depositing the same in a layer on said conveyer belt, means for pressing the material in said hopper toward said opening, means for concentrating the layer of material into a strand and means for twisting the strand, substantially as described.

35. In a hair curling machine, the combination with a conveyer for advancing a layer of material, means for concentrating the layer into a strand and means for twisting the strand, of a revolving hopper above the receiving end of said conveyer, and a rotating, toothed picker wheel for withdrawing material from said hopper and depositing the same in a layer on said conveyer, substantially as described.

36. In a hair curling machine, the combination with a conveyer for advancing a layer of material, means for concentrating the layer into a strand and means for twisting the strand, of a revolving hopper above the receiving end of said conveyer, a rotating, toothed picker wheel interposed between said conveyer and said hopper for withdrawing material from the latter and depositing the same in a layer on said conveyer, and means for pressing the material in said revolving hopper toward said picker wheel, substantially as described.

37. In a hair curling machine, the combination with a conveyer for advancing a layer of material, means for concentrating the layer into a strand and means for twisting the strand, of a revolving hopper above the receiving end of said conveyer, having a grated bottom portion, a rotating toothed picker wheel operating through the grated bottom portion of said hopper for withdrawing material therefrom and depositing the same in a layer on said conveyer, and a pressure roll for engaging the material in said hopper above said picker wheel, substantially as described.

38. In a hair curling machine, the combination of an annular hopper having revoluble inner and outer portions and a grated bottom portion, a conveyer, a rotating, toothed picker wheel operating through the grated bottom portion of said hopper for withdrawing material therefrom and depositing the same in a layer on said conveyer, a pressure roll for engaging the material in said hopper above said picker wheel, devices for concentrating and compressing the layer into a strand, and feed rolls for twisting and advancing the strand.

39. In a hair curling machine, the combination of an annular hopper having revoluble inner and outer portions and a stationary bottom provided with a discharge opening, a conveyer below said discharge opening, a picker wheel operating through said opening for withdrawing material from said hopper and depositing the same in a layer on said conveyer, means for driving said inner and outer hopper portions, said picker wheel and said conveyer, means for concentrating the layer of material into a strand, and means for twisting the strand, substantially as described.

40. In a hair curling machine, the combination of an annular hopper having revoluble inner and outer portions and a fixed bottom provided with a grated discharge opening, a pressure wheel for engaging the material in said hopper above said discharge opening, a rotating, toothed picker wheel operating through said discharge opening for withdrawing material therefrom, a conveyer belt whereon the material is deposited by said picker wheel in a layer, devices for concentrating and compressing the layer into a strand, and means for twisting the strand, substantially as described.

41. In a hair curling machine, the combination of a revolving hopper having a grated bottom portion, a rotating, toothed picker wheel below said hopper for withdrawing material therefrom, a pressure roller for engaging the material in said hopper above said picker wheel, a conveyer belt whereon the material is deposited in a layer by said picker wheel, converging belts above said conveyer belt for concentrating the layer into a strand, a pressure device for engaging the strand at the delivery end of said belts, and means for receiving, twisting and advancing the strand.

42. In a hair curling machine, the combination of a conveyer belt and means for withdrawing material from a mass and depositing the same in a layer on said belt, devices having forwardly moving working faces for condensing and compressing the layer of material into an untwisted strand, and means for receiving and twisting the strand having devices thereon for engaging and advancing the strand.

43. In a hair curling machine, the combination of a conveyer belt for advancing a layer of material, devices having forwardly moving working faces for condensing and compressing the layer of material into an untwisted strand, a rotary head for receiving and initially twisting the strand, said head having feed rolls thereon for gripping the strand between them at the axis of said head, and a second twister for finally twisting or kinking the strand.

44. In a hair curling machine, the combination of a belt conveyer for advancing a layer of material, devices having forwardly moving working faces for condensing the layer of material on said belt conveyer into a strand and for compressing the strand at the delivery end of said conveyer, and means for receiving, twisting and advancing the strand.

45. In a hair curling machine, the combination of a belt conveyer for advancing a layer of material, devices having forwardly moving working faces for condensing the layer of material on said belt conveyer into a strand and for compressing the strand at the delivery end of said conveyer, a rotary head for receiving and twisting the strand, and devices having forwardly moving working faces for gripping the strand at the axis of said head.

46. In a hair curling machine, the combination of a belt conveyer for advancing a layer of material, a supporting bed plate therefor, devices having forwardly moving working faces arranged above said conveyer and coöperating therewith to condense and compress the layer of material into a strand, and means for receiving, twisting and advancing the strand.

47. In a hair curling machine, the combination of a substantially horizontal conveyer belt, a hopper above the receiving portion of said belt, a revolving toothed picker drum having its axis substantially parallel to and at right angles to the path of movement of said belt and arranged to withdraw the material from said hopper and deposit the same in a layer on said conveyer belt, devices for concentrating the layer of material as it is advanced by said belt into a strand and for compressing the strand at the delivery end of said conveyer, and means for receiving and twisting the strand.

48. In a hair curling machine, the combination of a conveyer belt, a hopper, a revolving, toothed picker drum above and extending across said belt and arranged to withdraw material from said hopper and deposit the same in a layer on said belt, devices for condensing the layer of material on said belt into a strand and for compressing the strand at the delivery end of said conveyer, and a rotary head for receiving, twisting and advancing the strand.

49. In a hair curling machine, the combination of a conveyer belt, a hopper, a revolving toothed picker drum above and extending across said belt and arranged to withdraw material from said hopper and deposit the same in a layer on said belt, devices having forwardly moving working faces for condensing the layer of material on said belt into a strand and for compressing the strand at the delivery end of said conveyer, and a rotary head for receiving, twisting and advancing the strand.

50. In a hair curling machine, the combination with a conveyer and means for forming and twisting a strand, of toothed picker mechanism for withdrawing material from a mass and depositing the same in a layer on said conveyer and a revolving hopper for receiving the mass of material and moving the same past said picker mechanism.

51. In a hair curling machine, the combination with a conveyer and means for forming and twisting a strand, of a hopper for receiving a mass of material, said hopper having a grated discharge opening, toothed picker mechanism operating through said discharge opening for withdrawing material from said hopper and depositing the same in a layer on said conveyer, said hopper having means independent of said picker mechanism for moving the mass of material past said grated discharge opening, and means associated with said hopper for pressing the material toward said discharge opening.

52. In a hair curling machine, the combination with a conveyer and means for forming and twisting a strand, of a revolving toothed picker drum for withdrawing material from a mass and depositing the same in a layer on said conveyer, a grate extending over said drum and through which the teeth of said drum project, and hopper mechanism for receiving the mass of material and moving the same over said grate.

53. In a hair curling machine, the combination with a rotary head for receiving and initially twisting a strand, of a tapered horn mounted on said head and over which the twisted strand passes, a reel, a coöperating flier having means for guiding the strand from said horn onto said reel, and means for rotating said flier faster than said head, whereby said flier coöperates with said horn to finally twist or kink the strand.

54. In a hair curling machine, the combination with strand forming and compressing devices, of a rotary head for initially twisting the portion of the strand, between the same and said compressing devices, said head having means for engaging and advancing the same, a reel, a coöperating flier having means for guiding the strand from said head to said reel, and means for rotating said flier faster than said head to finally twist or kink the strand.

55. In a hair curling machine, the combination of a conveyer belt, picker mechanism for withdrawing material from a mass and depositing the same upon said conveyer belt, devices having forwardly moving faces for condensing and compressing the layer of material into a strand, a rotary head having feed rolls for gripping the strand between them and thereby initially twist the portion of the strand between said feed rolls and said strand compressing devices and a second twister for receiving and finally twisting or kinking the strand.

ANTON F. GRABOWSKI.

Witnesses:
J. G. ANDERSON,
A. R. CROSMAN.